(12) United States Patent
Ward et al.

(10) Patent No.: US 10,324,887 B2
(45) Date of Patent: Jun. 18, 2019

(54) REPLACING MECHANICAL/MAGNETIC COMPONENTS WITH A SUPERCOMPUTER

(71) Applicant: International Business Machines Corporation, Armonk, NY (US)

(72) Inventors: Thomas Ward, Romsey (GB); Blake Fitch, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/810,856

(22) Filed: Nov. 13, 2017

(65) Prior Publication Data

US 2019/0095376 A1 Mar. 28, 2019

Related U.S. Application Data

(63) Continuation of application No. 15/712,319, filed on Sep. 22, 2017.

(51) Int. Cl.
*G06F 9/54* (2006.01)
*G06F 13/42* (2006.01)
*G06Q 30/02* (2012.01)
*G06Q 10/08* (2012.01)

(52) U.S. Cl.
CPC .......... *G06F 13/4208* (2013.01); *G06F 9/541* (2013.01); *G06Q 10/087* (2013.01); *G06Q 30/0283* (2013.01)

(58) Field of Classification Search
None
See application file for complete search history.

(56) References Cited

U.S. PATENT DOCUMENTS

| 5,548,704 | A | * | 8/1996 | Steiner | G06F 9/451 715/807 |
| 6,216,164 | B1 | * | 4/2001 | Zaremba, Jr. | G06F 17/30893 707/E17.117 |
| 8,396,752 | B2 | | 3/2013 | Hartfield | |
| 8,543,977 | B2 | * | 9/2013 | Miron | G06F 9/548 717/106 |
| 9,195,521 | B2 | * | 11/2015 | Zhao | G06F 9/54 |
| 2004/0006745 | A1 | * | 1/2004 | van Helden | G06F 9/451 715/210 |
| 2012/0016816 | A1 | * | 1/2012 | Yanase | G06N 99/005 706/10 |

(Continued)

FOREIGN PATENT DOCUMENTS

WO 2011/085500 A1 7/2011

OTHER PUBLICATIONS

Elmaghraby, W., et al., "Dynamic Pricing in the Presence of Inventory Considerations: Research Overview, Current Practices and Future Directions", Management Science, Oct. 2003, 35 pages, vol. 49, Issue 10.

(Continued)

*Primary Examiner* — Elias Mamo
(74) *Attorney, Agent, or Firm* — Scully, Scott, Murphy & Presser, P.C.; Daniel P. Morris, Esq.

(57) ABSTRACT

A supercomputer comprising a memory device and a plurality of interconnected hardware processors capable of performing parallel processing is coupled to a mainframe computer comprising one or more hardware processors. The supercomputer functions as a part of the mainframe computer's memory hierarchy.

4 Claims, 3 Drawing Sheets

(56) References Cited

U.S. PATENT DOCUMENTS

2012/0271741 A1* 10/2012 Leonard ................ G06Q 10/08
                                                  705/28
2014/0095302 A1   4/2014 Monteverde
2014/0304032 A1  10/2014 Mitchell et al.
2015/0332393 A1  11/2015 Kerpel et al.

OTHER PUBLICATIONS

IBM, "IBM 2305 fixed head storage", IBM Archives, https://www-03.ibm.com/ibm/history/exhibits/storage/storage_2305.html, Printed on Sep. 22, 2017, 2 pages.

List of IBM Patents or Patent Applications Treated as Related, dated Nov. 13, 2017, 2 pages.

\* cited by examiner

US 10,324,887 B2

REPLACING MECHANICAL/MAGNETIC COMPONENTS WITH A SUPERCOMPUTER

CROSS-REFERENCE TO RELATED APPLICATIONS

This application is a continuation of U.S. patent application Ser. No. 15/712,319, filed Sep. 22, 2017 which is incorporated by reference herein in its entirety.

FIELD

The present application relates computer architecture, and more particularly to interfacing a supercomputer to a mainframe computer.

BACKGROUND

Organizations operating on mainframe computer systems, for example, a legacy computer, may depend on those systems to perform their day-to-day operations in providing goods and/or services to their customers. Given the amount of massive data that need to be processed and the dynamic nature of response time needed in the current computing environment, however, the mainframe computer systems alone may not have the capacity to meet those demands. Therefore, an improvement to the existing mainframe computers is desirable to be able to handle the modern demands of computing.

BRIEF SUMMARY

A computer system, in one aspect, may include a supercomputer that includes a memory device and a plurality of interconnected hardware processors capable of performing parallel processing. The computer system may also include a mainframe computer that includes one or more hardware processors coupled to the supercomputer. In one aspect, the supercomputer has faster processing capability than the mainframe computer in data processing, and the supercomputer functions as a part of the mainframe computer's memory hierarchy.

A method, in one aspect, may include connecting a supercomputer to a mainframe computer, the supercomputer having faster processing capability than the mainframe computer in data processing. The method may also include running a first application on the mainframe computer. The method may further include storing data on the supercomputer, the data for producing a result for the first application on the supercomputer. The method may also include invoking from the first application running on the mainframe an interface command to invoke a second application on the supercomputer.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
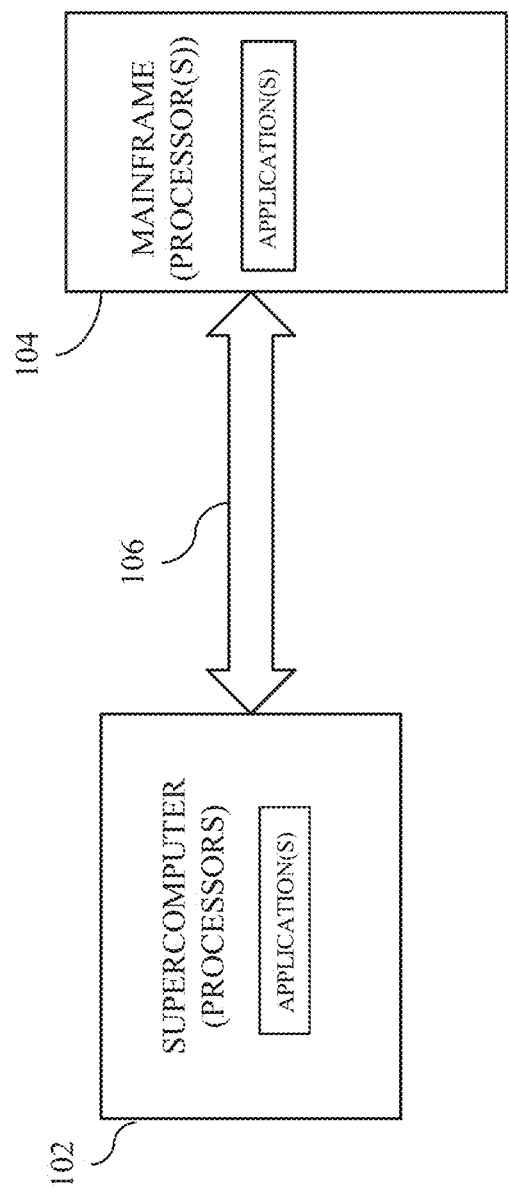
FIG. 1 is an architectural diagram illustrating components of a system in one embodiment.

A method, system and technique are presented in one embodiment that deploys a supercomputer to function as a component in a storage hierarchy, for example, of a mainframe computer. Such architectural arrangement of the computer components in a computer system provides for an improved way for the computer system to perform critical functions in computations in many applications, for example, generating price lists for the goods and services, inventory reorganization functions such as when an out-of-plan activity like cancellation of an aircraft flight occurs, and/or others.

In one embodiment, a supercomputer such as BlueGene® from International Business Machines (IBM) Corporation (Armonk, N.Y.), is connected adjacent to a mainframe-class computer. Examples of a mainframe computer may include, but are not limited to, IBM System/370, IBM System/390, and IBM System z (zSeries). The supercomputer may be installed adjacent to a mainframe computer running a transaction processing middleware such as IBM® Customer Information Control System (CICS). Transaction programs may access the supercomputer using file control interfaces such as EXEC CICS READ and EXEC CICS WRITE (Virtual Storage Access Method (VSAM)) commands, and using distributed transaction programming interfaces such as the EXEC CICS LINK command.

With the architectural arrangement in one embodiment of a supercomputer and mainframe computer, science and commercial supercomputing is enabled in existing mainframe class of computers. Computationally intensive commercial transactions such as the regenerating of a price list and discount schedule tend to be an infrequently performed activity (e.g., a quarterly activity) for many enterprises because of the amount of modeling and processing effort involved in a "turn of the crank". The methodology of the present disclosure in one embodiment allows for deployment of significantly additional processing power to the task without making obsolete the existing mainframe machines, and reduces the processing time, for instance, to less than a second. The methodology of the present disclosure in one embodiment consequently allows for computationally intensive activities to be performed more frequently, for example, hourly or daily. For example, commercial transactions such as price lists and discount schedules may be regenerated more frequently.

The current generation of supercomputers contains 4 terabyte (TB) of memory and 4096 processing cores per rack. There is sufficient internal networking bandwidth to allow all the data to be exchanged from one half of the machine to the other half every few milliseconds (ms). In one embodiment, the memory of a supercomputer is used to store the data (e.g., 'inventory') of an entity such as a business organization. An example of 'inventory' of a business organization is the set of products it has for sale, and the quantity of each product that is ready to be sold. The 'inventory' of a business organization may also include estimates of the inventories of competitive business.

In addition to storing the data for the mainframe computer, the supercomputer may search the data and create a model based on the data. For example, for the 'inventory' data, the supercomputer may model the effect on profitability of selling an inventory element at any proposed price. This search/model function on the supercomputer may be automatically triggered in response to a purchaser or another user navigating on a computer, for example, a web page or another user interface, for example, to purchase the inventory element.

For instance, an airline business may have as its 'inventory' a bit-map indicating which seats had not yet been sold. For example, with 1000 flights per day, 500 seats per flight, and a seat-selling 'horizon' of 1 year, 'inventory' computes to 183 million bits. While this may be a relatively small amount of information, the airline may want an estimate of the 'inventory' of other airlines, may want information to model the likely demand from potential clients, and may want to model the how likely potential customers may be able to purchase flight seats. 4 TB amount of inventory-type information may be considered reasonable for defining and refining models.

The processors in supercomputers may run 'yield management' models. Yield management is an established field of optimization. An example yield management result may include a 'price list' (e.g., an indication for each of the currently unsold seats, the 'list price' that the airline may offer to sell a seat), and for example, a discount structure (e.g., if a customer requested 10 seats, what offer should be accepted).

Yield management may be performed with only a few processors, and only a few gigabytes (GB) of inventory information. However, simplifying assumptions may need to be introduced to make the problem tractable. These assumptions may mean that the resulting price list is not competitively optimal for the business.

FIG. 1 is an architectural diagram illustrating components of a system in one embodiment. A supercomputer 102 is connected to a mainframe computer 104, and functions as part of a memory hierarchy in the mainframe computer. A supercomputer 102, for example, is a high-performance computer that includes multiple processors or processing cores, for instance, capable of performing massively parallel processing. A supercomputer 102 may include a shared memory and/or a distributed memory system among its processors. A supercomputer, for instance, may include processor configurations that connect its processors by torus interconnect, for example, 2-dimensional or 3-dimensional torus interconnect configuration.

A mainframe computer 104 may include one or more processors, and include applications such as middleware applications running on the mainframe computer 104.

A connection 106 between the supercomputer 102 and the mainframe computer 104 may be achieved by a network link such as Ethernet between the supercomputer and the mainframe. Ethernet refers to computer networking technologies, for instance, used in local area networks (LAN), wide area networks (WAN) and/or others. Ethernet provides a network protocol that controls how data is transmitted over a network, for example, the LAN or WAN. Ethernet may use special twisted pair or fiber optic cables, or another type of cables, that physically connect the machines (e.g., 102 and 104). Data is transmitted over the Ethernet cables or cables using the Ethernet protocol. Ethernet is a non-limiting example of a connection 106. Other connections are possible.

In one embodiment, the supercomputer is housed in the same machine room as (or near) the mainframe so as to achieve a low-latency link between the machines (supercomputer 102 and mainframe computer 104). For instance, a threshold latency value may be configured, and the supercomputer may be housed such that the connection distance between the supercomputer and the mainframe computer is such that the communication latency in communications between the super computer and the mainframe computer does not exceed the threshold latency value. For example, the supercomputer may be placed within a threshold distance from the mainframe computer such that a latency in accessing the data on the supercomputer from the application running on the mainframe computer does not exceed a threshold latency value An application (e.g., referred to as a first application) running on the mainframe computer 104 may access data stored on the supercomputer 102 by invoking file control or other interfaces. For instance, the file control (e.g., EXEC CICS READ/WRITE) interface flows over the Ethernet link (e.g., 106) between the machines 102, 104. The task control (e.g., EXEC CICS LINK) interface also flows across the Ethernet link (e.g., 106).

In one embodiment, the data may be initially transferred to the supercomputer 102 by EXEC CICS READ/WRITE operations executed from the mainframe computer 104, or may be transferred by an offline application which uses the Ethernet interface between the machines 102, 104.

The supercomputer 102 may include numerous, e.g., thousands of processors, and has one or more applications running on the supercomputer 102. The supercomputer may have faster processing capability than the mainframe computer in data processing. The connection 106 may be an Ethernet link (or multiple Ethernet links) between the machines 102, 104.

For instance, a first application may run on the mainframe computer 104 and a second application may run on the supercomputer 102. The supercomputer 102 stores data for the first application to produce a result. For example, the first application may invoke the second application to search the data and generate a model based on the data, the result produced based on the model. The second application communicates the result to the first application. In one embodiment, the supercomputer 102 is placed within a threshold distance of the mainframe computer 104 such that a latency in receiving the result by the first application from the supercomputer 102 does not exceed a threshold latency value.

A supercomputer's position, placed adjacent to a mainframe, in one embodiment enables improved resources to be deployed to a task, for example, such as described above. Interfaces such as those included IBM CICS may be employed to connect the supercomputer to a mainframe computer. For example, 'EXEC CICS READ' and 'EXEC CICS WRITE' interfaces can create and update the 'inventory' in the supercomputer's random access memory (RAM), 'EXEC CICS LINK' interface may initiate the task (historically known as a CPIC back-end) which operates the economic model and returns the new result, for example, the new price list to the seat-selling system in the above-described example. For instance, dynamic prices may be computed based on current inventory data (e.g., changing inventory data) with more efficient speed or faster than the mainframe computer alone may be able to.

The computer architecture of the present disclosure may be applicable to 'distribution-channel' computing systems, for example, those which perform operations for selling large quantities of broadly similar items (such as plane seats, hotel accommodations/rooms) and for achieving competitive success by differentiating factors such as prices for items.

Figure 2:
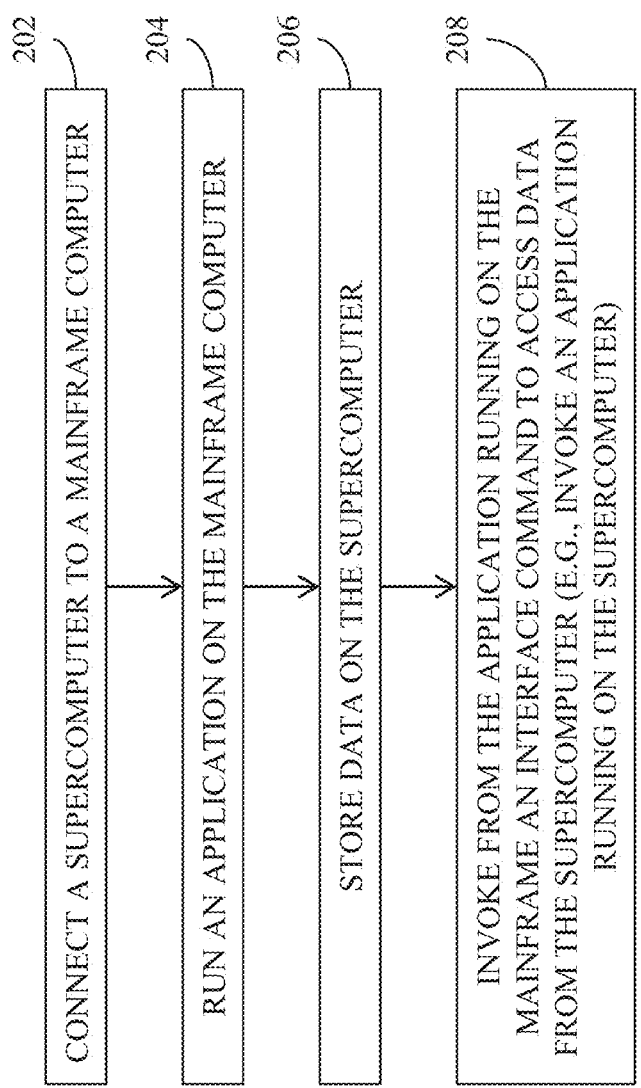
FIG. 2 is a flow diagram illustrating a method in one embodiment of the present disclosure.

FIG. 2 is a flow diagram illustrating a method in one embodiment of the present disclosure. At 202, a supercomputer may be connected or coupled to a mainframe computer. At 204, an application is run on the mainframe computer. At 206, data needed to run the application is stored on the supercomputer. In one embodiment the data may have been stored offline previously on the supercomputer. At 208, the application running on the mainframe computer invokes one or more interface commands to access the supercomputer, for example, data stored on the supercomputer, for the application to perform its functions on the mainframe computer. For example, the application (referred to as a first application) running on the mainframe computer may invoke or call an interface command to invoke an application (referred to as a second application) on the supercomputer. The application on the supercomputer performs data searches and modeling. The application on the supercomputer searches the data on the supercomputer, and performs modeling calculations on this data. An example result of this modeling may include a price quotation for which an inventory element should be offered for sale. For example, the first application invokes the second application to search the data and generate a model based on the data, the result produced based on the model, and the second application communicates the result to the first application. In one embodiment, the supercomputer is places within a threshold distance of the mainframe computer such that a latency in receiving the result by the first application from the supercomputer does not exceed a threshold latency value.

Figure 3:
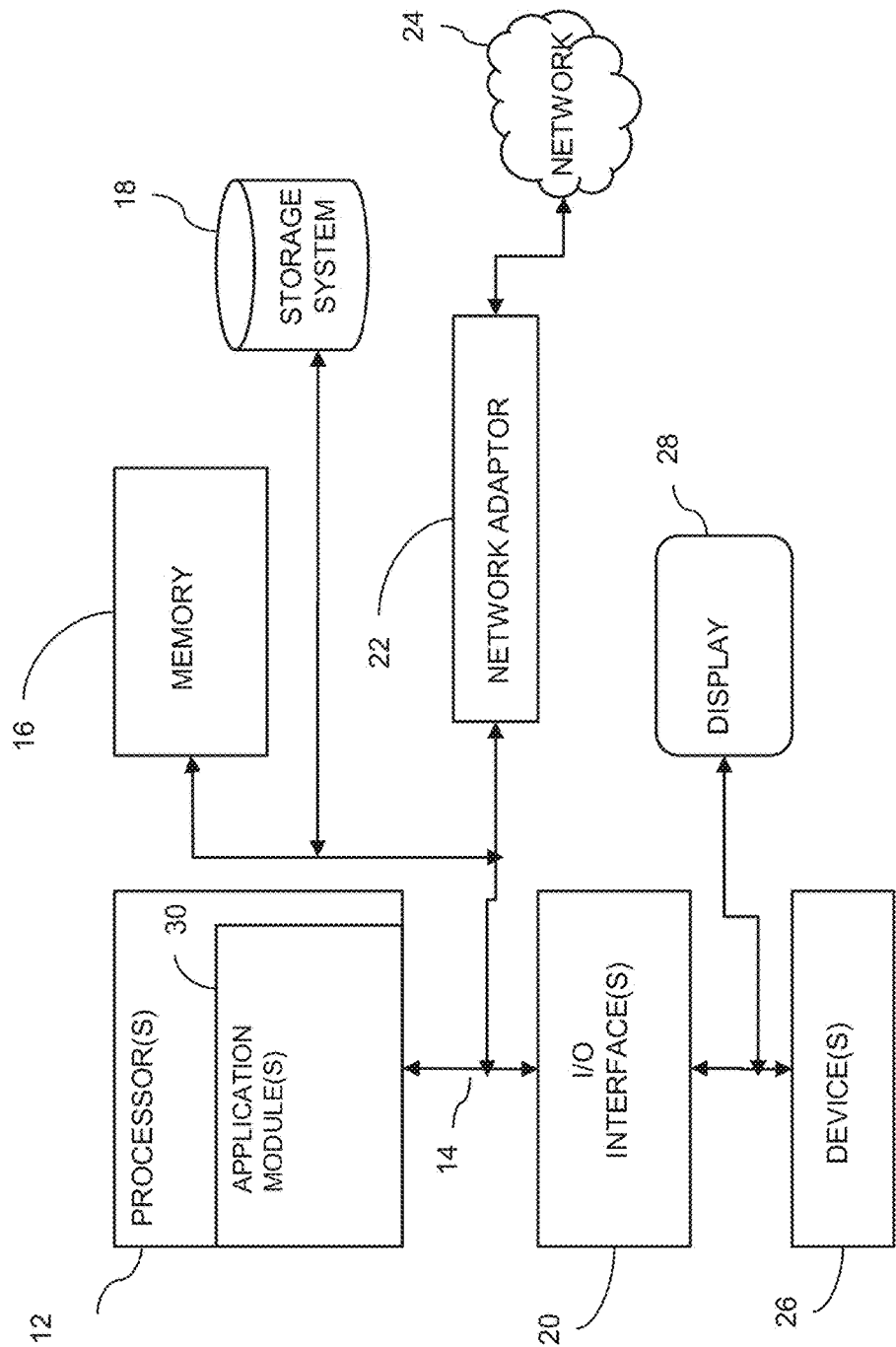
FIG. 3 illustrates a schematic of an example computer or processing system, for example, a mainframe computer system.

FIG. 3 illustrates a schematic of an example computer or processing system, for example, a mainframe computer system shown in FIG. 1. The computer system is only one example of a suitable processing system and is not intended to suggest any limitation as to the scope of use or functionality of embodiments of the methodology described herein. The processing system shown may be operational with numerous other general purpose or special purpose computing system environments or configurations.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an application module 30 performing a dedicated functionality. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method comprising:

connecting a supercomputer to a mainframe computer, the supercomputer having faster processing capability than the mainframe computer in data processing;

running a first application on the mainframe computer;

storing data on the supercomputer, the data for producing a result for the first application; and invoking from the first application running on the mainframe, an interface command to invoke a second application on the supercomputer, the supercomputer functioning as a part of the mainframe computer's memory hierarchy, wherein the first application invokes the second application to search the data and generate a model based on the data, the result produced based on the model, the second application communicating the result to the first application, wherein the supercomputer is placed within a threshold distance of the mainframe computer such that a latency in receiving the result by the first application from the supercomputer does not exceed a threshold latency value.

2. The method of claim 1, wherein the supercomputer and the mainframe computer are connected via an Ethernet link.

3. The method of claim 1, wherein the interface command comprises Customer Information Control System (CICS) commands.

4. The method of claim 1, wherein the data comprises inventory data of an organization, and the second application computes dynamic price lists.

* * * * *